United States Patent
Krauss et al.

(10) Patent No.: US 9,329,678 B2
(45) Date of Patent: May 3, 2016

(54) AUGMENTED REALITY OVERLAY FOR CONTROL DEVICES

(75) Inventors: Aaron Krauss, Snoqualmie, WA (US); Stephen Latta, Seattle, WA (US); Mike Scavezze, Bellevue, WA (US); Daniel McCulloch, Kirkland, WA (US); Brian Mount, Seattle, WA (US); Kevin Geisner, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 85 days.

(21) Appl. No.: 13/585,520

(22) Filed: Aug. 14, 2012

(65) Prior Publication Data

US 2014/0049558 A1  Feb. 20, 2014

(51) Int. Cl.
*G06F 3/01* (2006.01)
*H04N 21/422* (2011.01)
*G02B 27/01* (2006.01)

(52) U.S. Cl.
CPC .............. *G06F 3/011* (2013.01); *G02B 27/017* (2013.01); *H04N 21/42208* (2013.01); *H04N 21/42226* (2013.01); *G02B 2027/014* (2013.01); *G02B 2027/0138* (2013.01); *G02B 2027/0178* (2013.01); *G02B 2027/0187* (2013.01); *G05B 2219/32014* (2013.01)

(58) Field of Classification Search
CPC ....... G06T 19/006; G06T 19/00; G06F 3/011; G06F 3/012; G02B 27/017
See application file for complete search history.

(56) References Cited

U.S. PATENT DOCUMENTS

| | | | |
|---|---|---|---|
| 6,972,665 B2 | 12/2005 | Wang et al. | |
| 7,358,956 B2 | 4/2008 | Hinckley et al. | |
| 7,619,688 B2 | 11/2009 | Inoue | |
| 7,814,122 B2 | 10/2010 | Friedrich et al. | |
| 2001/0016806 A1 | 8/2001 | Ronen | |
| 2005/0022139 A1 | 1/2005 | Gettman et al. | |
| 2006/0241792 A1* | 10/2006 | Pretlove et al. | 700/83 |
| 2009/0189830 A1* | 7/2009 | Deering | G09G 3/02 345/1.3 |

(Continued)

FOREIGN PATENT DOCUMENTS

| CN | 1547131 A | 11/2004 |
|---|---|---|
| CN | 101571748 A | 11/2009 |

(Continued)

OTHER PUBLICATIONS

"System for Augmented Reality Visualization of Systems Management Data," ip.com Journal, ip.com Inc., West Henrietta, NY, US, Nov. 16, 2009, 8 pages.

(Continued)

*Primary Examiner* — James A Thompson
(74) *Attorney, Agent, or Firm* — Dan Choi; Judy Yee; Micky Minhas

(57) ABSTRACT

Embodiments for providing instructional information for control devices are disclosed. In one example, a method on a see-through display device comprising a see-through display and an outward-facing image sensor includes acquiring an image of a scene viewable through the see-through display and detecting a control device in the scene. The method also includes retrieving information pertaining to a function of an interactive element of the control device and displaying an image on the see-through display augmenting an appearance of the interactive element of the control device with image data related to the function of the interactive element.

20 Claims, 17 Drawing Sheets

(56) References Cited

U.S. PATENT DOCUMENTS

| | | |
|---|---|---|
| 2009/0319058 A1 | 12/2009 | Rovaglio et al. |
| 2011/0199389 A1 | 8/2011 | Lu et al. |
| 2011/0221672 A1 | 9/2011 | Osterhout et al. |
| 2012/0154557 A1 | 6/2012 | Perez et al. |
| 2013/0069985 A1* | 3/2013 | Wong et al. .................. 345/633 |
| 2013/0127980 A1 | 5/2013 | Haddick et al. |
| 2013/0253830 A1 | 9/2013 | Breisinger et al. |
| 2013/0293577 A1* | 11/2013 | Perez .................. G02B 27/017 345/633 |
| 2013/0328927 A1 | 12/2013 | Mount et al. |

FOREIGN PATENT DOCUMENTS

| | | |
|---|---|---|
| CN | 102123194 A | 7/2011 |
| CN | 102968549 A | 3/2013 |
| CN | 103246350 A | 8/2013 |
| WO | 2010088156 A2 | 8/2010 |
| WO | 2011156135 A1 | 12/2011 |

OTHER PUBLICATIONS

ISA European Patent Office, International Search Report and Written Opinion of PCT/US2013/054750, Sep. 19, 2013, Netherlands, 9 pages.

Liu, et al., "Evaluating the Benefits of Real-time Feedback in Mobile Augmented Reality with Hand-held Devices", Retrieved at <<http://hci.rwth-aachen.de/materials/publications/liu2012a.pdf>>, In CHI'12: Proceedings of the 30th International Conference on Human Factors in Computing Systems, Jan. 1-27, 2012, pp. 4.

Tang, et al., "Comparative Effectiveness of Augmented Reality in Object Assembly", Retrieved at <<http://mindlab.msu.edu/biocca/pubs/papers/2003_AR_Assembly.pdf>>, Proc of the SIGCHI Conference on human factors in computing system, Apr. 5, 2003, pp. 73-80.

"Apple Invents a New Kind of Synchronized and Interactive Augmented Reality Display for iOS Devices", Retrieved at <<http://www.patentlyapple.com/patently-apple/2011/07/apple-invents-a-new-kind-of-synchronized-and-interactive-augmented-reality-display-for-ios-devices.html>>, May 15, 2011, pp. 10.

European Patent Office, Extended European Search Report Issued in European Patent Application No. 13198232.4, Jun. 2, 2014, Germany, 6 Pages.

Espacenet Abstract of AU7557898, Inventors: Latypov et al., Publication date: Nov. 27, 1998, Available online at: https://worldwide.espacenet.com/publicationDetails/biblio?FT=D&date=19981127&DB=&locale=en_EP&CC=AU&NR=7557898A&KC=A&ND=4, 16 pages. (Original patent document not available, submitted with corresponding U.S. Pat. No. 6,563,489 as explanation of relevance).

The State Intellectual Property Office of China, Office Action and Search Report Issued in Chinese Patent Application No. 201310757253.9, Feb. 29, 2016, China, 11 pages.

* cited by examiner

AUGMENTED REALITY OVERLAY FOR CONTROL DEVICES

BACKGROUND

When utilizing a control device, a user may be uncertain of a function of interactive elements, such as buttons, of the control device. Information regarding the function of such inputs may be acquired via trial-and-error testing, by searching online, by consulting an on-screen or printed user manual, etc. However, such solutions may be inconvenient in some situations. For example, online resources or user manuals may be difficult to locate or unavailable for some control devices. Further, trial-and-error testing may result in undesirable instructions being passed from the control device to a device being controlled.

SUMMARY

Embodiments are disclosed herein that relate to providing instructional information for control devices on a see-through display device. For example, one disclosed embodiment provides a method comprising acquiring an image of a scene viewable through the see-through display, detecting a control device in the scene, retrieving information pertaining to a function of an interactive element of the control device, and displaying an image on the see-through display augmenting an appearance of the interactive element of the control device with image data related to the function of the interactive element.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As discussed above, a user of a control device may wish to acquire information regarding functionalities of interactive elements on the control device. Thus, embodiments are disclosed herein relating to providing such information via a see-through display device. For example, as described in more detail below, a see-through display device may be configured to provide information regarding functions of interactive elements of a control device as augmented reality images displayed over the user's view of the control device.

Figure 1:
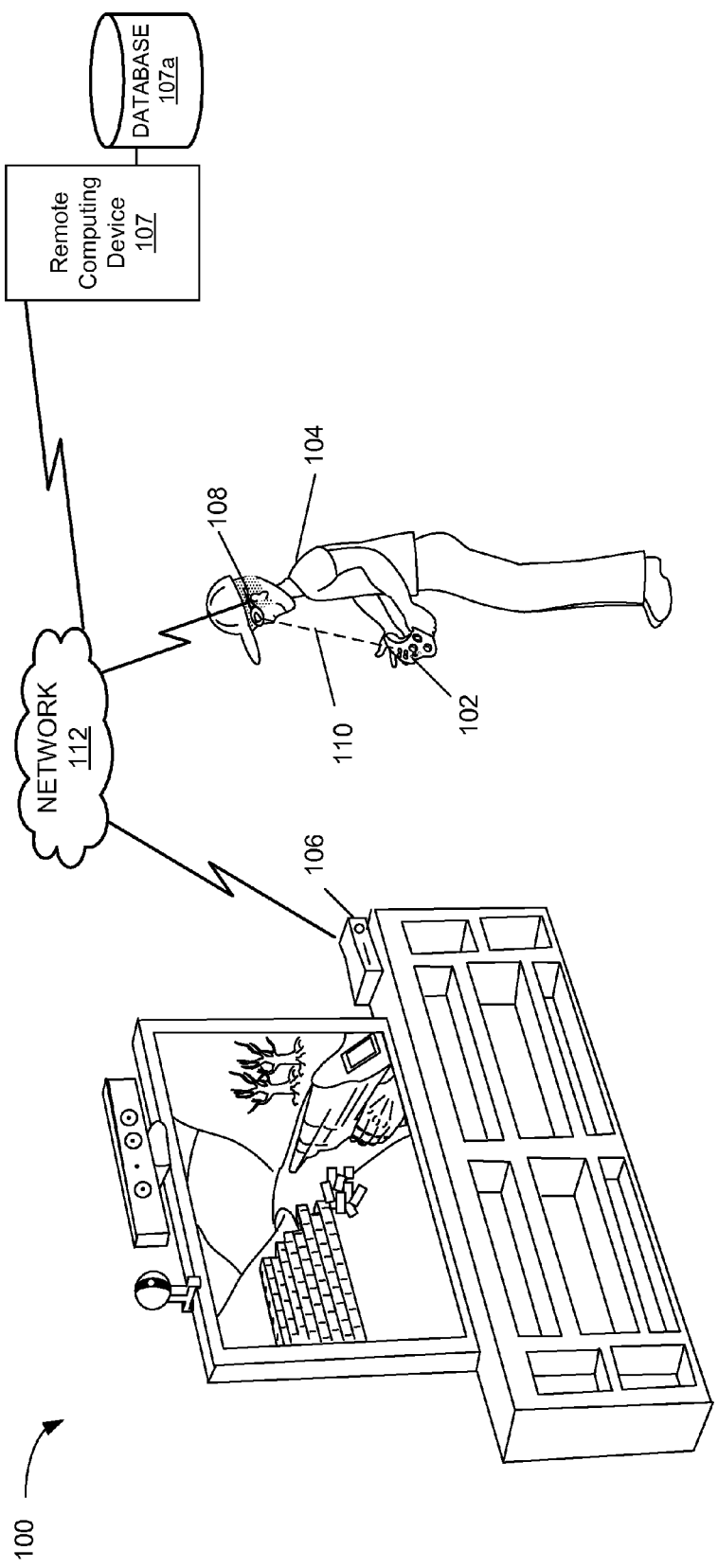
FIG. 1 schematically shows an example physical space including an embodiment of a control device.

FIG. 1 shows an example embodiment of a physical space 100 including a control device 102, and shows a user 104 interacting with the control device 102 to control an associated computing device 106. As a non-limiting example, the control device 102 may be a video game controller and the computing device 106 may be a video game console. Other examples of control devices and associated computing devices include, but are not limited to, keyboards and other input devices for personal computers, remote controls for audio/visual equipment, dashboard controls for vehicles, remote controls for televisions and other electronic items keypads for kiosks, etc.

The user 104 may view the control device 102 through a see-through display device, an embodiment of which is shown at 108. The depicted see-through display device 108 takes the form of a head mounted device (HMD) that allows both hands of the user 104 to be free to interact with other objects, such as the control device 102. The see-through display device 108 includes a see-through display system configured to allow the visual augmentation of an appearance of the physical space 100 to the user 104. In other words, the see-through display allows light from the physical space 100 to pass through the see-through display so that the user 104 can directly see the actual physical space 100 in addition to one or more virtual objects displayed as an overlay to the actual physical space 100.

In one non-limiting example, when a gaze 110 of the user 104 is directed toward the control device 102, the see-through display device 108 may display one or more virtual objects in the form of information pertaining to one or more functions of the control device. The displayed information may be obtained in any suitable manner. For example, the displayed information may be received from the computing device 106, a remote computing device 107 via a network 112 (wherein the remote control device may communicate with a database 107a that stores information regarding control device functionalities), the control device 102, etc.

Figure 2:
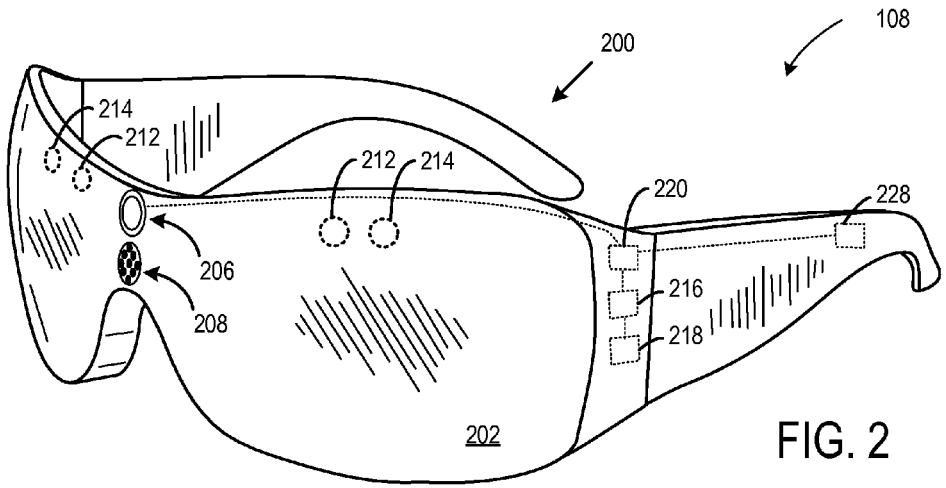
FIG. 2 shows an example embodiment of a see-through display device according to an embodiment of the present disclosure.
Figure 3:
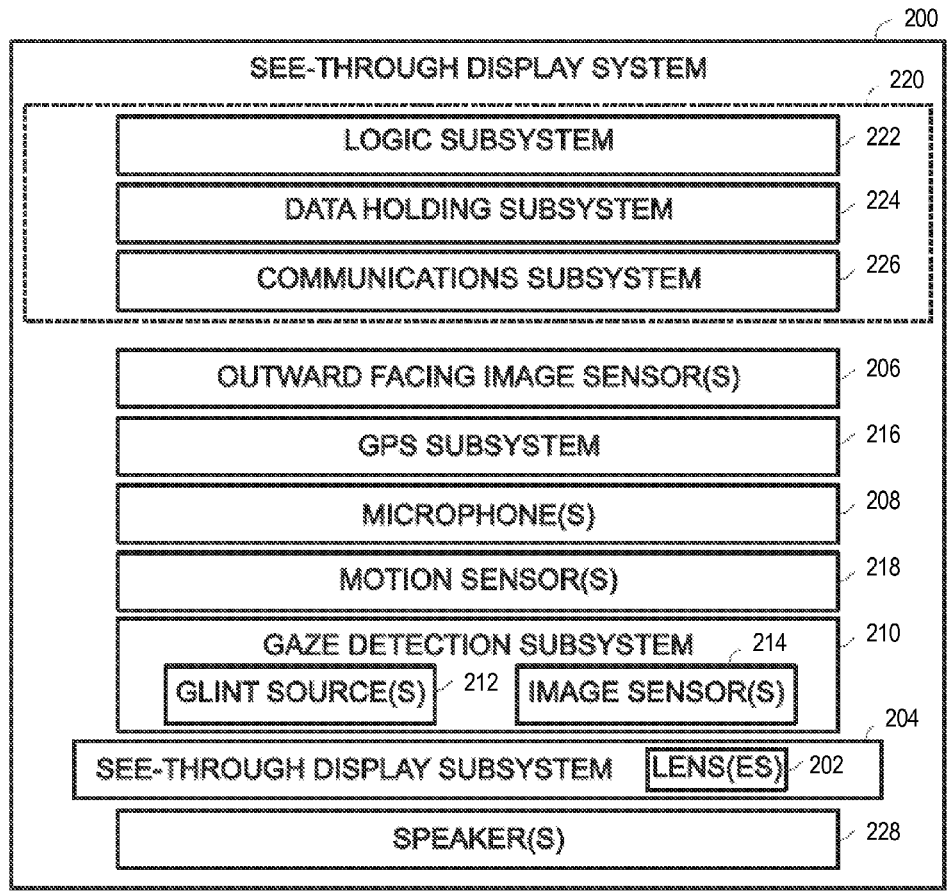
FIG. 3 shows a block diagram of the embodiment of FIG. 2.

A see-through display device according to the present disclosure may take any suitable form, including but not limited to HMD devices such as the head-mounted see-through display device 108 of FIG. 1. FIG. 2 shows an example embodiment of the see-through display device 108 including a see-through display system 200, and FIG. 3 shows a block diagram of the see-through display system 200.

The see-through display system 200 comprises one or more lenses 202 that form a part of a see-through display subsystem 204, such that images may be projected onto the lenses 202, or produced by see-through image-producing elements (e.g. transparent OLED displays) incorporated into the lenses 202. The see-through display system 200 further comprises one or more outward-facing image sensors 206 configured to acquire images of a background scene and/or physical space being viewed by a user, and may include one or more microphones 208 configured to detect sounds, such as voice commands from a user. The outward-facing image sensors 206 may include one or more depth sensors and/or one or more two-dimensional image sensors.

The see-through display system 200 may further comprise a gaze detection subsystem 210 configured to detect a direction of gaze of each eye of a user, as described above. The gaze detection subsystem 210 may be configured to determine gaze directions of each of a user's eyes in any suitable manner. For example, in the depicted embodiment, the gaze detection subsystem 210 comprises one or more glint sources 212, such as infrared light sources, configured to cause a glint of light to reflect from each eyeball of a user, and one or more image sensors 214, such as inward-facing sensors, configured to capture an image of each eyeball of the user. Changes in the glints from the user's eyeballs as determined from image data gathered via the image sensor(s) 214 may be used to determine a direction of gaze. Further, a location at which gaze lines projected from the user's eyes intersect the external display may be used to determine an object at which the user is gazing (e.g. a virtual object displayed on an external display). The gaze detection subsystem 210 may have any suitable number and arrangement of light sources and image sensors.

The see-through display system 200 may further comprise additional sensors. For example, the see-through display system 200 may comprise a global positioning (GPS) subsystem 216 to allow a location of the see-through display system 200 to be determined. For example, the location of the see-through display system 200 may be used to identify a control device in a field of view of the user.

The see-through display system 200 further may include one or more motion sensors 218 to detect movements of a user's head when the user is wearing the see-through display system 200. Motion data may be used, potentially along with eye-tracking glint data and outward-facing image data, for gaze detection, as well as for image stabilization to help correct for blur in images from the outward-facing image sensor(s) 206. The use of motion data may allow changes in gaze location to be tracked even if image data from the outward-facing image sensor(s) 206 cannot be resolved. Likewise, the motion sensors 218, as well as the microphone(s) 208 and the gaze detection subsystem 210, also may be employed as user input devices, such that a user may interact with the see-through display system 200 via gestures of the eye, neck and/or head, as well as via verbal commands. It will be understood that sensors illustrated in FIGS. 2 and 3 are shown for the purpose of example and are not intended to be limiting in any manner, as any other suitable sensors and/or combination of sensors may be utilized.

The see-through display system 200 further comprises a controller 220 having a logic subsystem 222 and a data holding subsystem 224 in communication with the sensors, the gaze detection subsystem 210, and the see-through display subsystem 204. The data holding subsystem 224 comprises instructions stored thereon that are executable by the logic subsystem 222, for example, to receive and interpret inputs from the sensors, to determine an existence and identity of a control device and/or computing device at which the user is gazing (e.g. by communicating with the control device, a computing device controlled by the control device, or another computing device via a communications subsystem 226), and to receive and present information regarding the control device and/or computing device via the see-through display subsystem 204, one or more speakers 228, and/or other output device.

It will be appreciated that the depicted see-through display device 108 is described for the purpose of example, and thus is not meant to be limiting. Therefore it is to be understood that the see-through display device may include additional and/or alternative sensors, cameras, microphones, input devices, output devices, etc. than those shown without departing from the scope of this disclosure. Further, the physical configuration of a see-through display device and its various sensors and subcomponents may take a variety of different forms without departing from the scope of this disclosure.

Figure 4A:
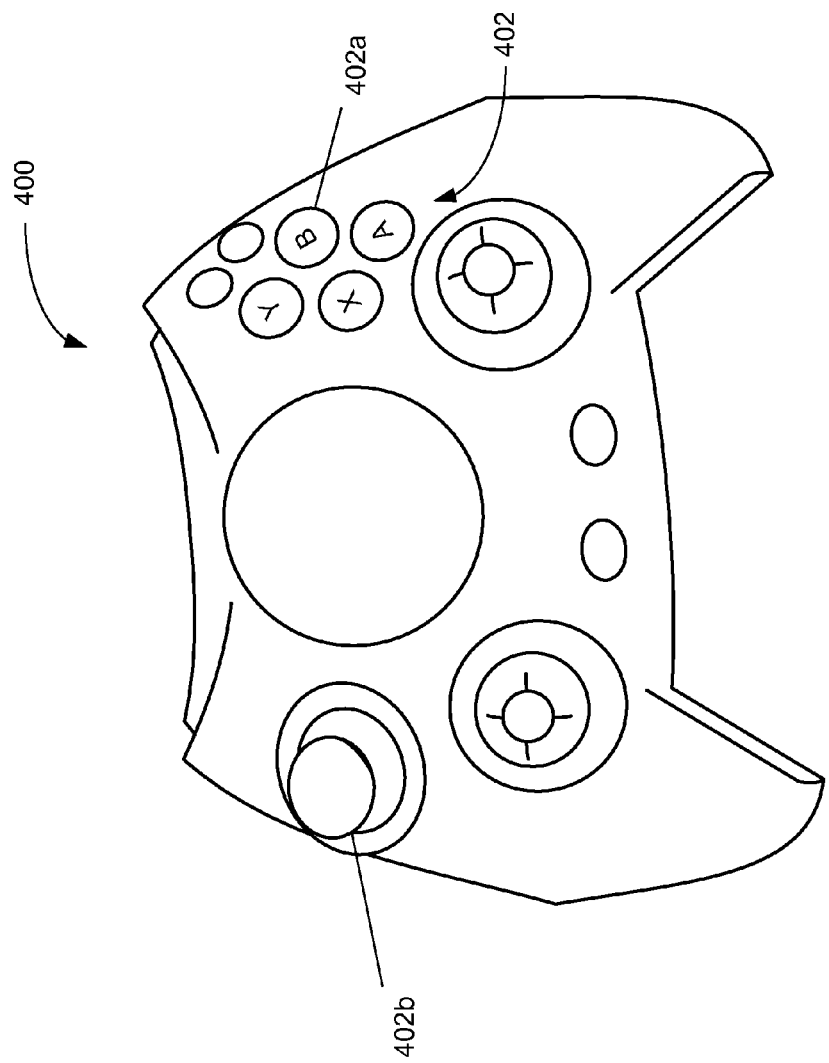
FIG. 4A shows another embodiment of a control device.

Turning now to FIG. 4A, an example control device is shown as a video game controller 400. The video game controller 400 may include one or more interactive elements 402 (two examples of which are indicated at 402a and 402b). In a non-limiting example, the interactive elements 402 may be user-actuatable hardware buttons that may be depressed to provide an instruction to a video game application running on a video game console (not shown in FIG. 4A). The interactive elements 402 may also include joysticks, directional pads, software buttons, touch-sensitive input devices, dials, triggers, knobs, motion sensors, etc. It will be understood that the depicted arrangement of interactive elements 402 is shown for the purpose of example, and any suitable number, arrangement, and type of interactive element may be included on the video game controller 400.

Figure 4B:
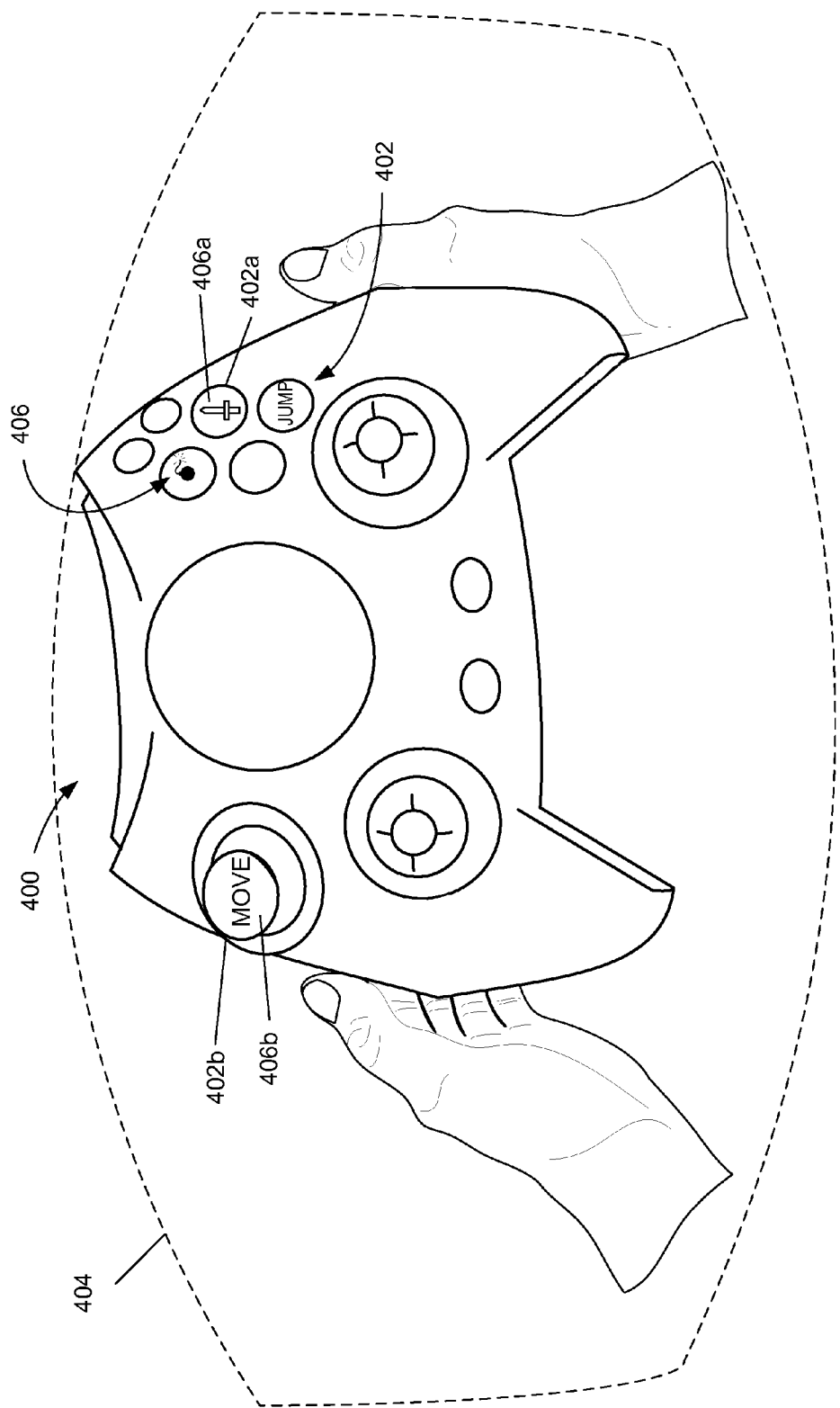
FIG. 4B shows an example augmentation of the control device of FIG. 4A according to an embodiment of the present disclosure.

FIG. 4B illustrates the video game controller 400 from the point of view of a user viewing the video game controller 400 through a see-through display device. A dashed line 404 represents an example field of view of the see-through display device. The appearance of the interactive elements, when viewed through a see-through display device, may be augmented in order to provide information relating to one or more functions of the interactive elements. In FIG. 4B, such augmentation is illustrated as images 406 that overlay the interactive elements of the control device. Each image 406 may provide the user with an indication of the function of the interactive element 402 over which it is displayed.

Any suitable information may be displayed in images that overlay interactive elements. In the depicted embodiment, some of the images 406 include a graphical representation of a weapon or type of attack that is associated with the interactive button positioned below the image. For example, as indicated at 406a, a graphical representation of a sword may indicate that pressing an associated button allows a user to perform a sword attack in a game application. The images 406 may additionally or alternatively include text. For example, as indicated at 406b, the word "MOVE" may indicate that interacting with an associated joystick 402b allows a user to move a character of a video game application in various directions.

It will be understood that the images depicted in FIG. 4B and described above are presented for the purpose of example, and any suitable graphical representation may be displayed to provide information regarding the interactive elements 402 of the video game controller 400. For example, the images may include icons, pictures, videos, etc., that provide information regarding the interactive elements of the video game controller. Further, the images may indicate the presence of an audio or video clip relating to the interactive elements 402. In such embodiments, a user may select the audio or video clip to begin playback, or the audio or video clip may begin in an automated fashion.

Figure 5:
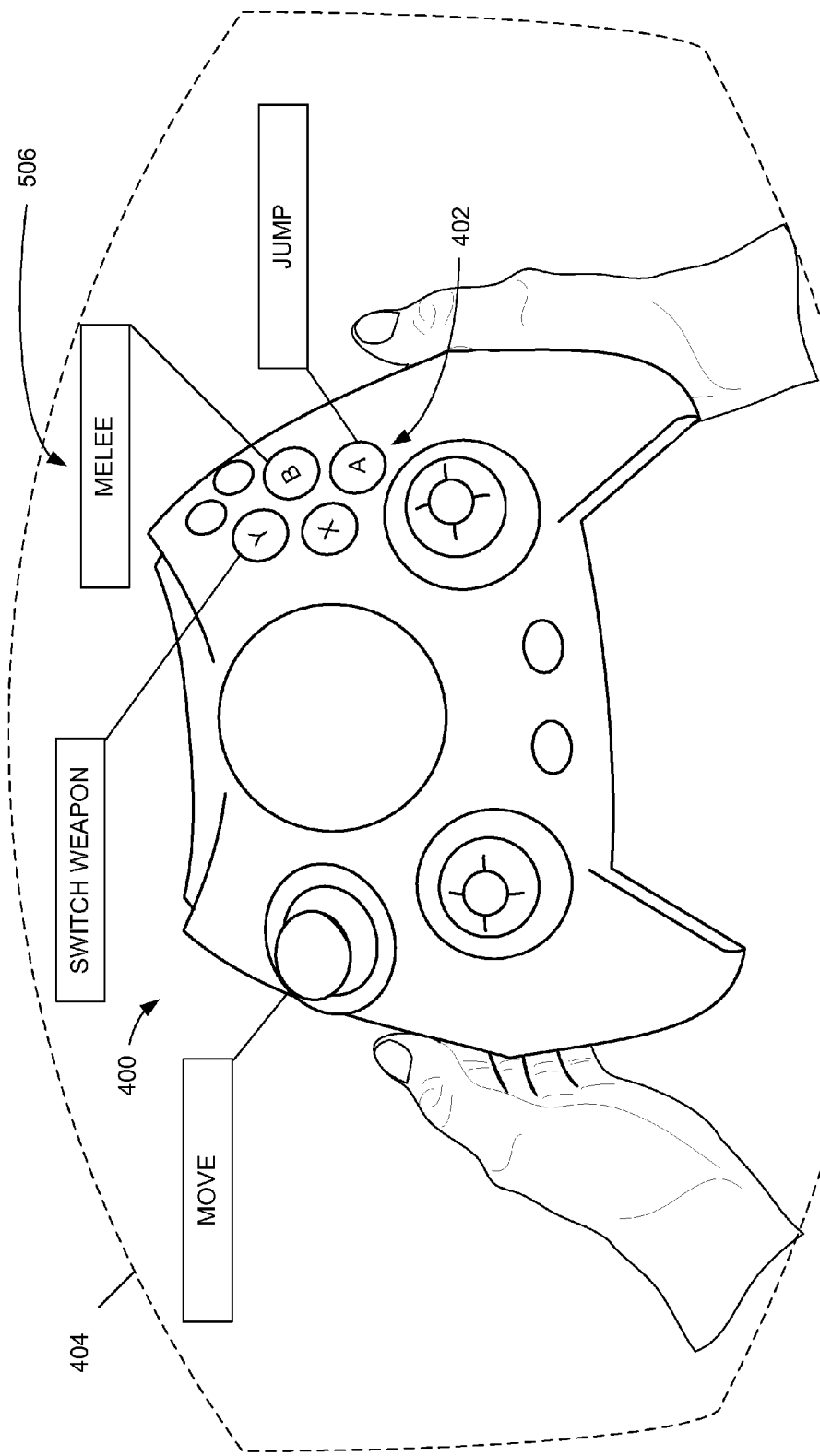
FIG. 5 shows another example augmentation of the control device of FIG. 4A.

FIG. 5 shows another example augmentation of the control device of FIG. 4A. In the depicted embodiment, images 506 take the form of text-based fly-outs or tooltips. The fly-outs or tooltips may comprise text boxes having text information describing an associated interactive element, and/or any other suitable information. Other examples include, but are not limited to, icons, pictures, animations, and videos.

In some embodiments, an application that the video game controller 400 is controlling may change state during game play. Such state changes may affect the functionality of interactive elements of the video game controller 400. For example, interactive elements may have different functions in different game scenes. Likewise, even in a single scene, an interactive element may have a different function when actuated alone than when actuated in combination with other controls. Changing from one game to another is another example of a state change that may affect the functionality of interactive elements of the video game controller 400.

Accordingly, a see-through display device may change augmenting imagery response to such state changes so that current functionalities of interactive elements are correctly displayed. In some embodiments, such updating may be animated, while in other embodiments any other suitable transitions may be used.

Figure 6A:
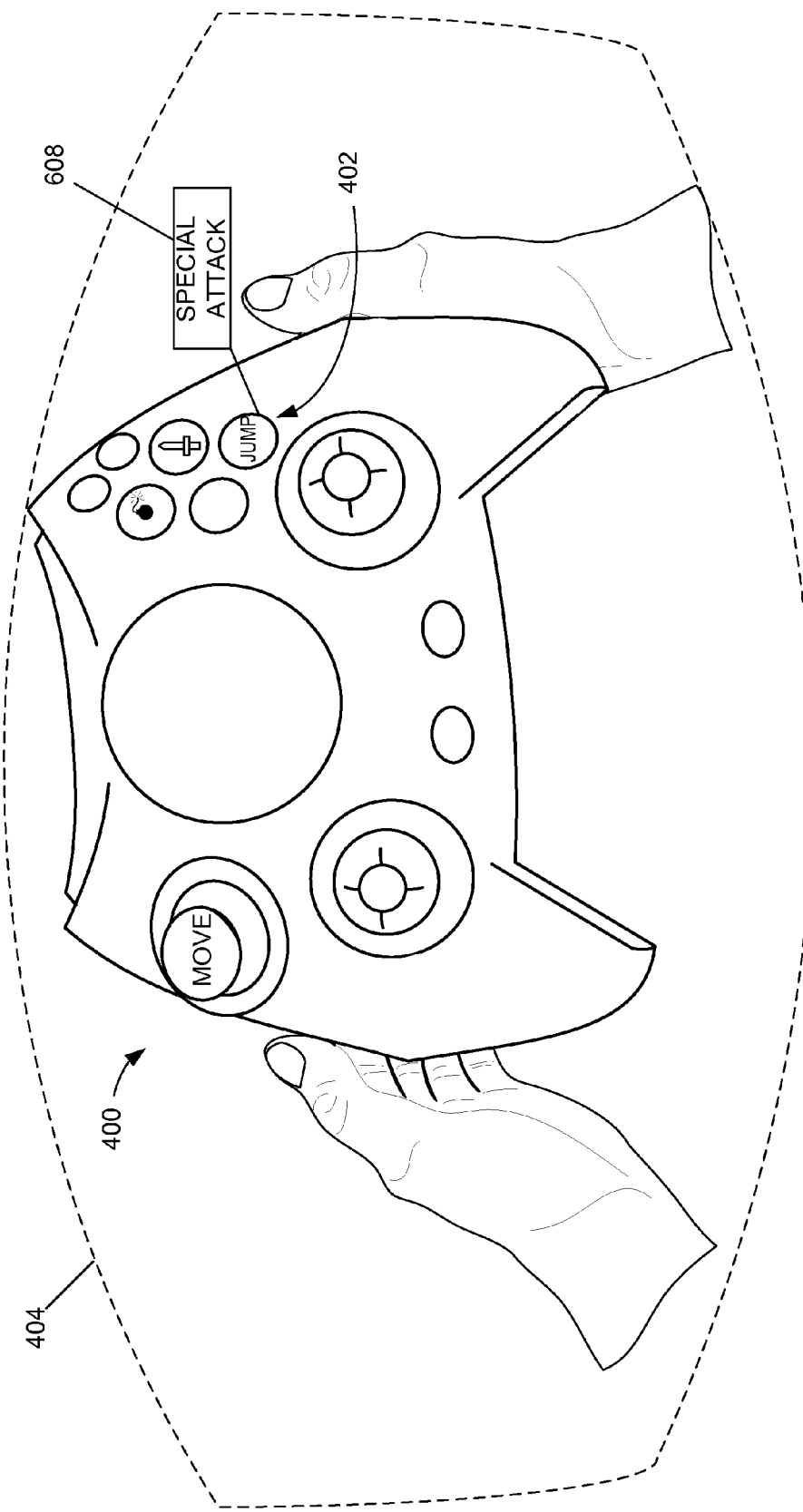
FIGS. 6A-6C show an example multi-step augmentation of the control device of FIG. 4A.
Figure 6B:
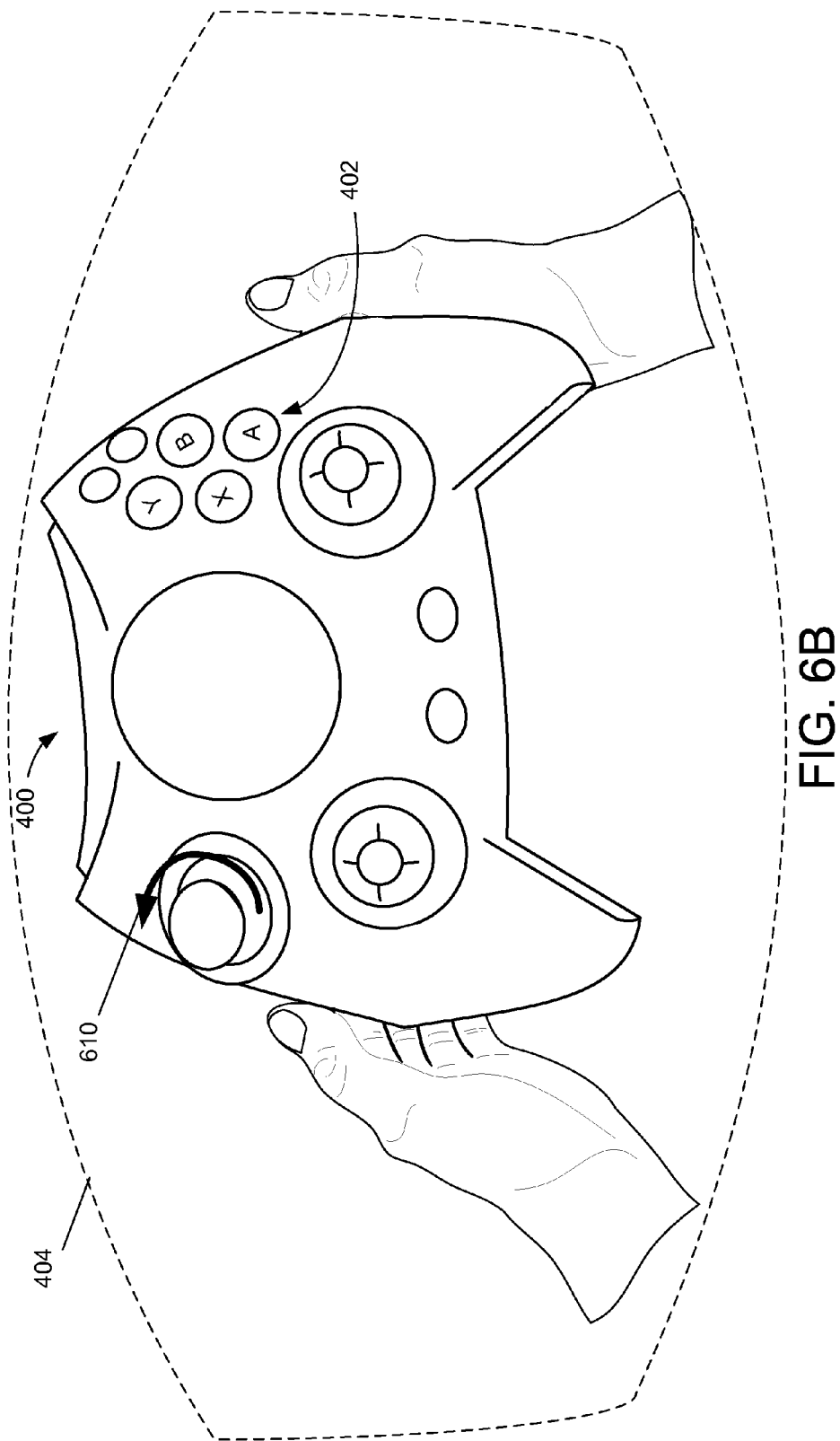
Figure 6C:
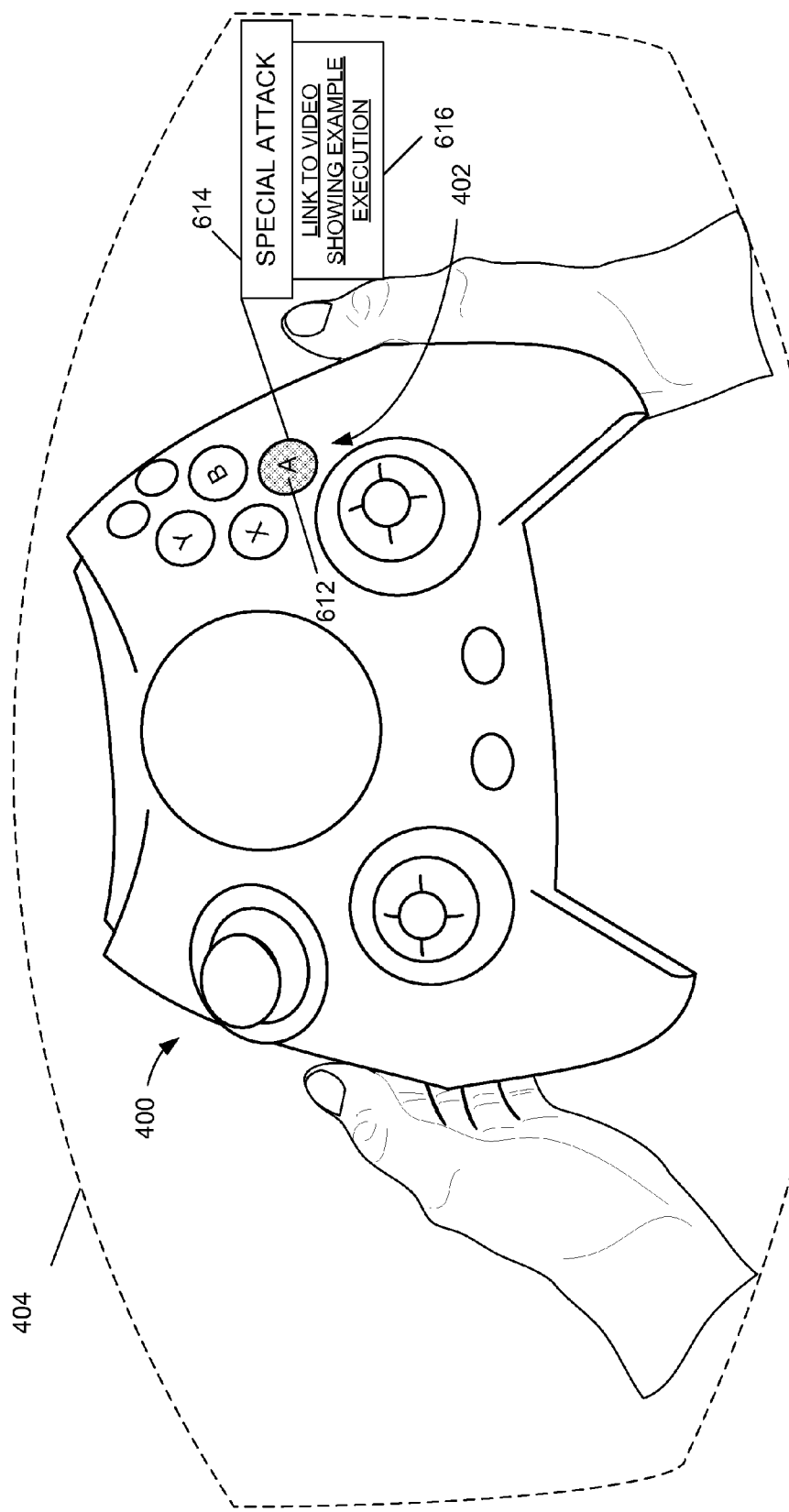

Augmenting imagery also may be used to illustrate and instruct how to perform multi-step inputs. FIGS. 6A-6C show an example embodiment of the display of such augmentation. As illustrated in FIG. 6A, a fly-out 608 is displayed, indicating that a special attack is available (e.g. due to a particular series of user inputs, entry into a particular virtual location in the game application, acquiring a new virtual item in the game application, etc.)

After displaying the fly-out 608, the see-through display device may illustrate a next step of the multi-step input, as illustrated in FIG. 6B. In some embodiments, the illustration of the next step is automatically displayed after a first frame (e.g. the frame illustrated in FIG. 6A) is displayed for a predetermined amount of time. In other embodiments, the illustration of the next step may be displayed upon user action, for example, by actuating the interactive element (e.g. pushing a button), directing a gaze to the element, providing a voice command, performing a gesture, etc.

FIG. 6B illustrates the display of the second step of the multi-step input. In this step, an arrow 610 is displayed, directing the user to move the left joystick in a counter clockwise circle. In some embodiments, the arrow 610 and/or any augmentation displayed over the left joystick may be animated to provide an additional indication that motion is involved in a step of an input combination. Continuing, FIG. 6C illustrates a display of the final step of the multi-step input as a shaded overlay image 612 indicating a particular interactive element 402 to press.

Additional information on each step and/or the multi-step input may be displayed via other augmenting imagery. For example, in FIG. 6C, the fly-out 614 comprises a retractable text box extension 616 that displays additional information pertaining to the animation and/or input combination. In the depicted embodiment, the text box extension 616 may include a hyperlink to a video showing an example execution of a special attack. In other embodiments, the text box extension 616 may include one or more of additional instructions for performing the special attack, an embedded video or audio clip relating to the special attack, etc. In some embodiments, such a text box extension 616 may be extended or retracted based on selection of a corresponding control associated with fly-out 614.

Figure 7A:
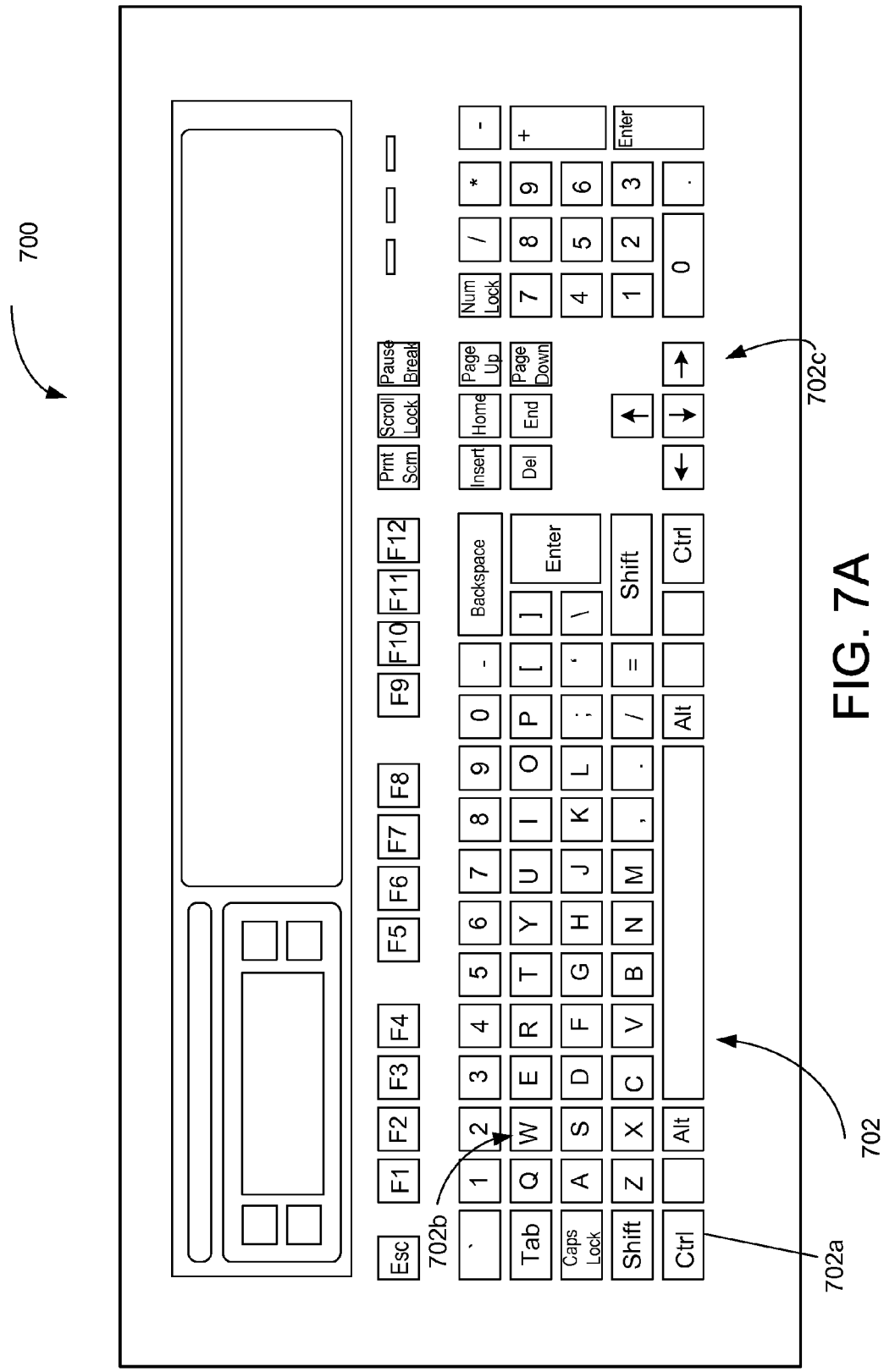
FIG. 7A shows another embodiment of a control device.

FIG. 7A shows another example embodiment of a control device in the form of a keyboard 700 comprising a plurality of keys 702. The keys 702 may be physical buttons or software-based "soft keys" on a touch-sensitive input device. One or more of the keys 702 may have different functions based on the particular application, computing device, etc. being controlled. For example, during some uses, key 702a may be a control key of the keyboard 700, keys 702b may be letter keys of the keyboard 700, and keys 702c may be directional keys of the keyboard 700.

Figure 7B:
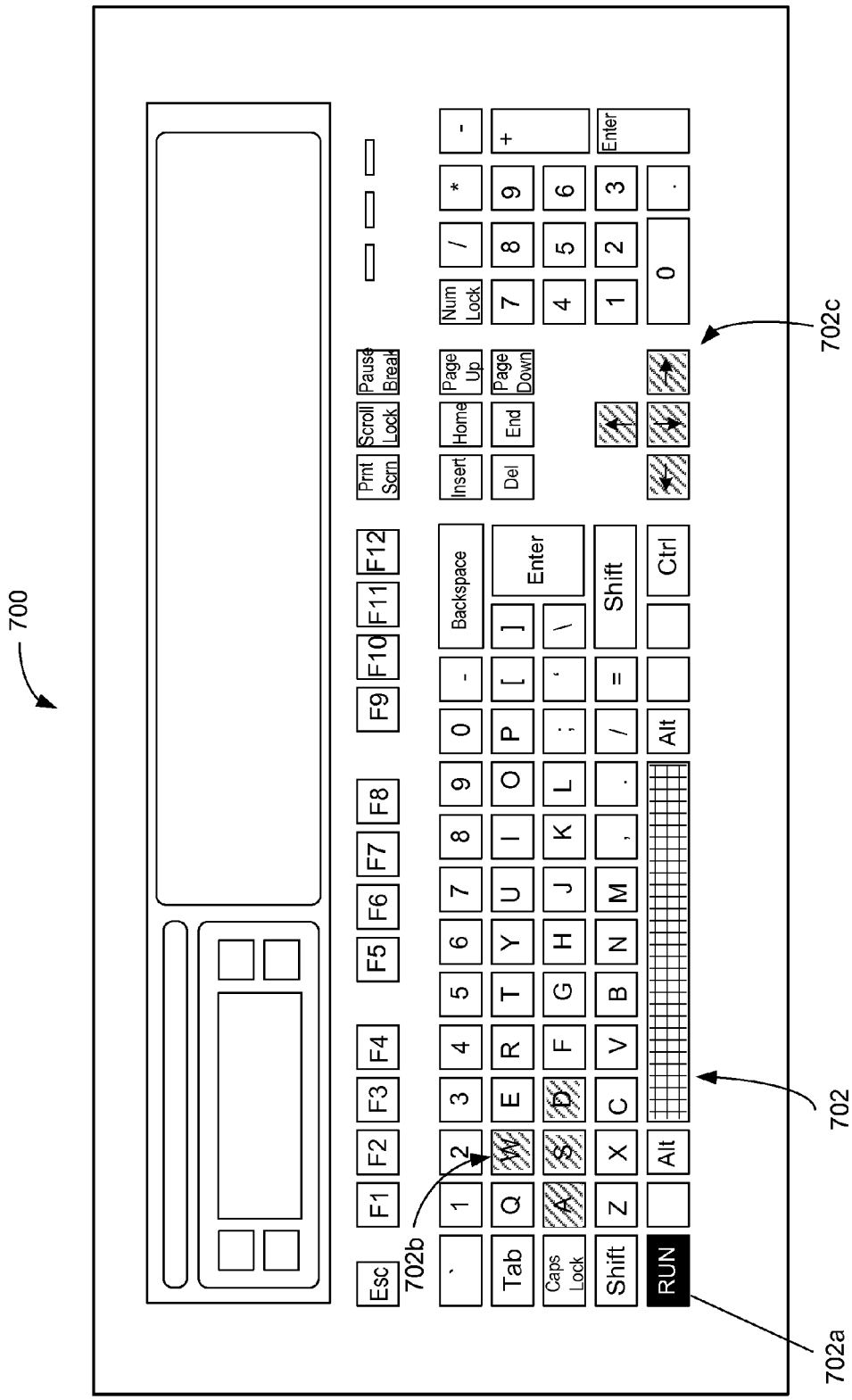
FIG. 7B shows an example augmentation of the control device of FIG. 7A.

In other uses, these keys may have different functions. For example, letter keys 702b may be used as directional keys in a video game. Thus, FIG. 7B shows an example augmentation of the keyboard 700 with augmentation images that provide information on these different functions. For example, the "CTRL" indicia on control key 702a may be obscured to display overlay text such as "RUN." Likewise, "W," "A," S," and "D" keys 702b may all have a same color overlay as the directional arrow keys 702c, indicating that these keys have a related function as directional keys (e.g. up, left, down, right). The augmenting images may completely obscure the underlying keyboard indicia, or may be partially transparent such that the underlying keyboard indicia remain visible. It will be understood that these specific embodiments of augmenting images are presented for the purpose of example, and are not intended to be limiting in any manner, as any other suitable augmenting imagery may be used.

The augmenting images may further be controllable by one or more user preferences. For example, a user may select a language and/or character set to use when augmenting images. Such settings also may be used to automatically translate any text detected by the see-through display device that is not in the preferred language. User preferences also may be used to select preferred colors and/or color schemes to be used for color overlays or other augmentation images. For example, a color blind mode may be selected to display variations of colors detectable by users with color vision deficiencies. It will be understood that these embodiments are presented for the purpose of example, and that user preferences may be used to control any suitable aspect of an augmenting image.

Figure 8A:
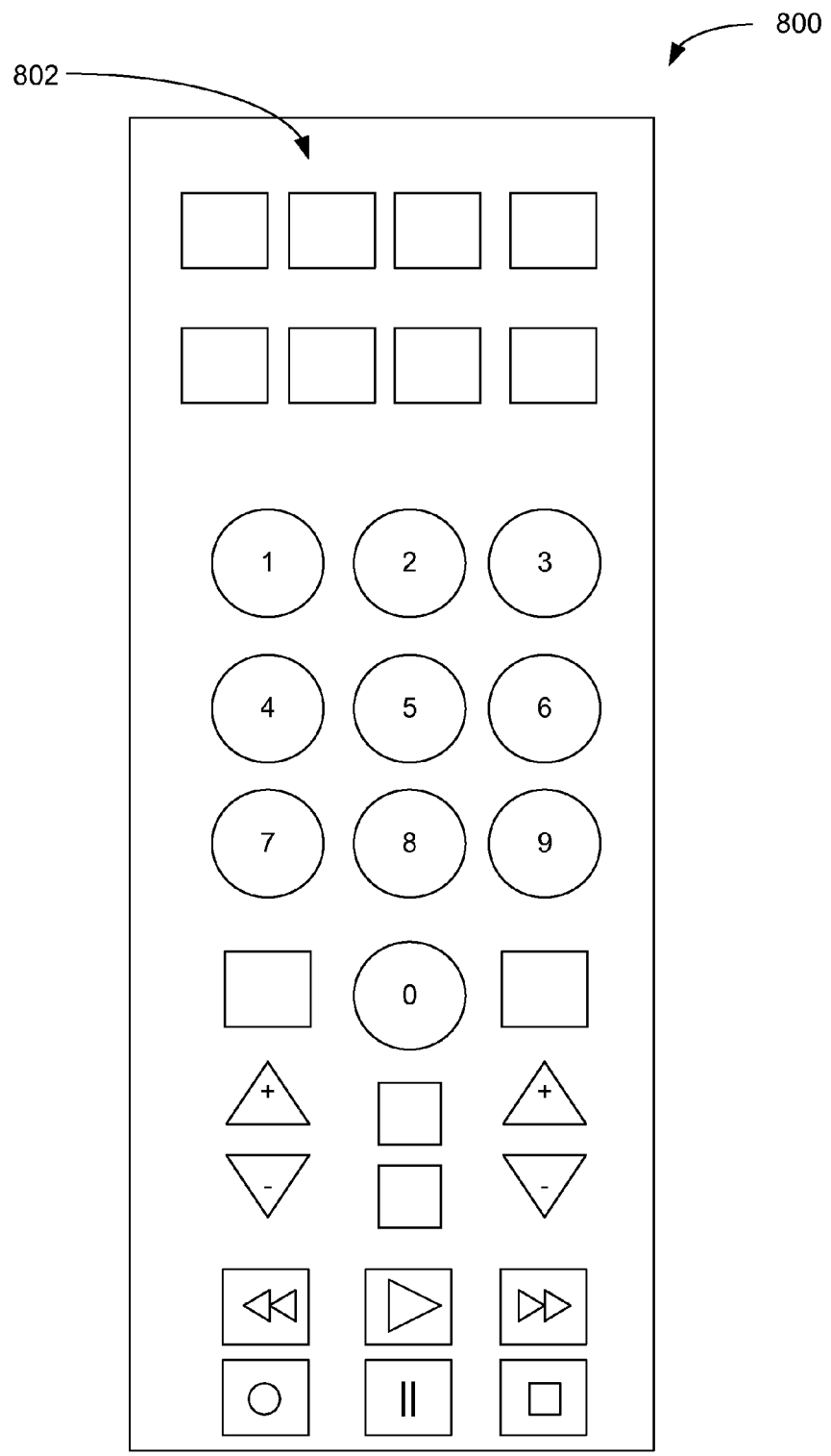
FIG. 8A shows another embodiment of a control device.

FIG. 8A shows another embodiment of a control device in the form of a remote control 800 that may be used to provide user input to televisions, audio receivers, multimedia devices, and the like. The remote control device 800 may include a plurality of user-actuatable interactive elements, such as buttons 802, which may have different functions based on a computing device being controlled, an application being controlled, a state of an application being controlled, etc.

Figure 8B:
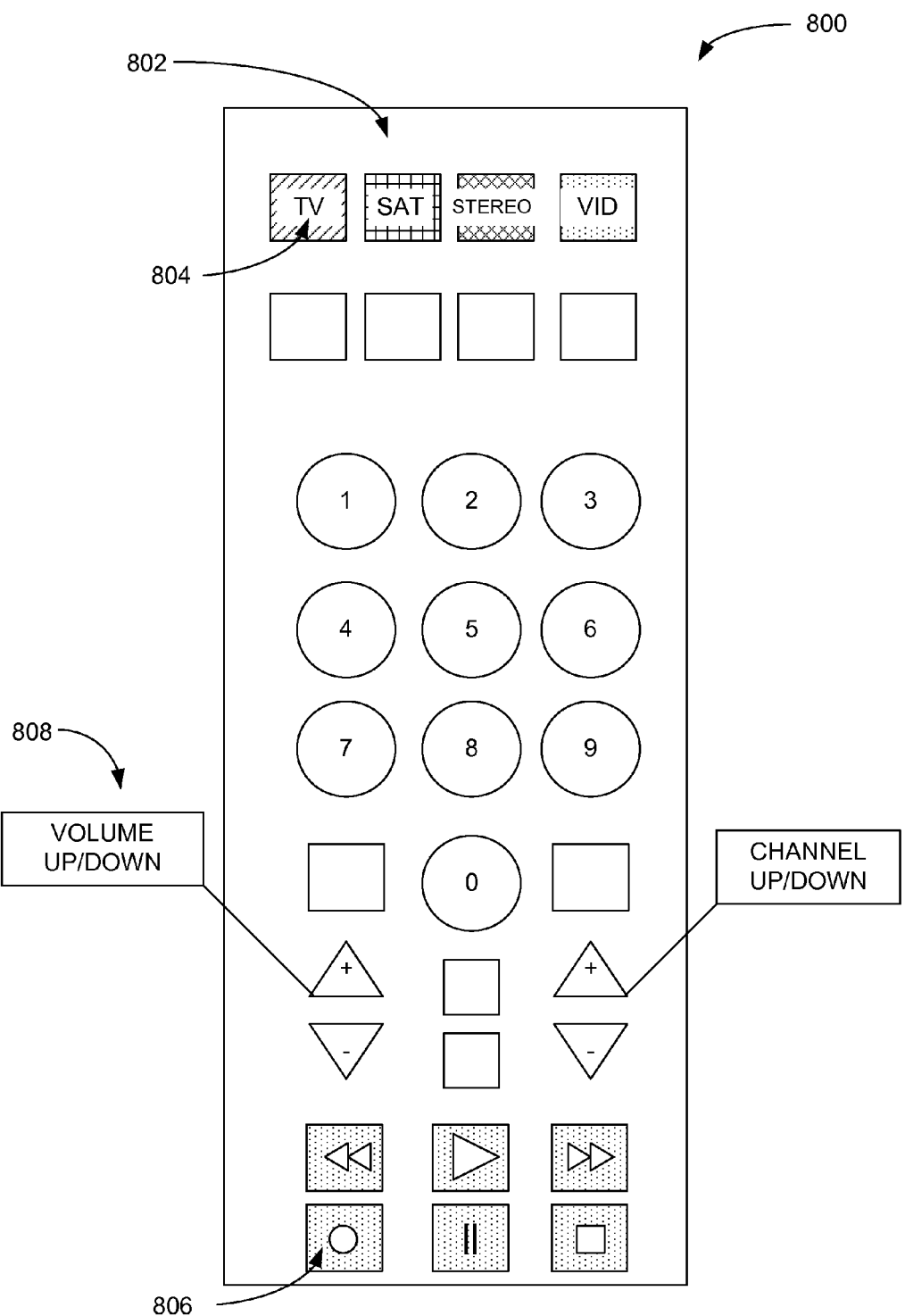
FIG. 8B shows an example augmentation of the control device of FIG. 8A.

FIG. 8B shows an example of augmentation imagery displayed over the remote control device 800 via a see-through display device. As shown in FIG. 8B, the buttons 802 are augmented with augmentation images 804, 806, and 808 that display information regarding the functionality of buttons of the remote control device 800. For example, the remote control device 800 may have a plurality of modes corresponding to different devices being controlled. Thus, as depicted, each mode is designated by a graphical overlay, such as that shown by "TV" at 804. Further, indicia representing functionalities of interactive elements within each mode may be displayed, as indicated by DVD player control indicia 806. Fly-outs 808 are also shown as indicating volume and channel changing functionalities. Further, the augmentation images 804, 806, and 808 may update dynamically in response to a mode change.

Figure 9:
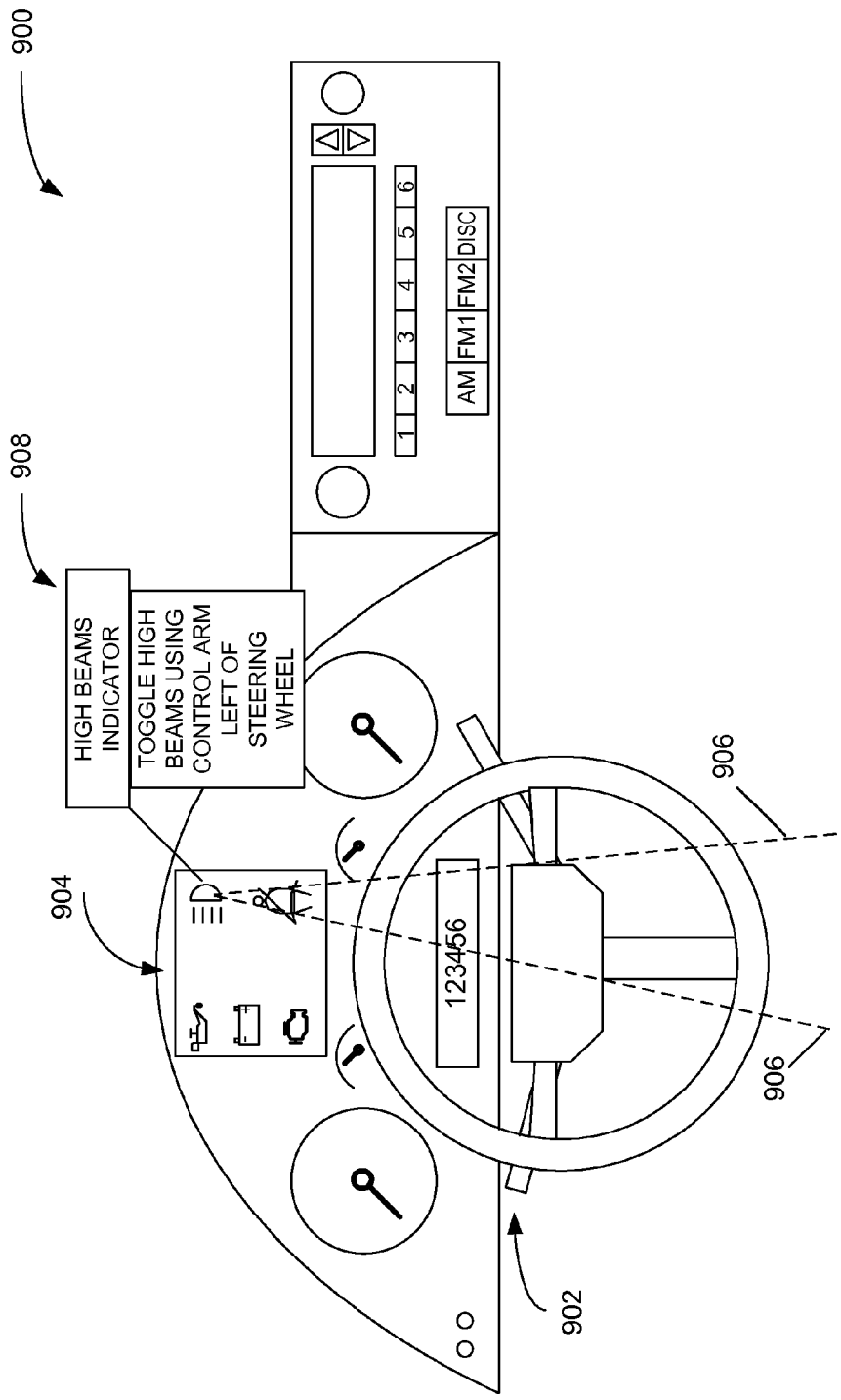
FIG. 9 shows an example augmentation of an embodiment of a vehicle dashboard.

FIG. 9 shows another embodiment of control devices in the form of controls of a vehicle dashboard 900, including user-actuatable controls 902 and displays 904, as viewed through a see-through display device. At times, a user may wish for information regarding a functionality of a control or display. As such, the user may indicate a dashboard element for which more information is desired (e.g. a particular indicator light), for example, by voice command, gesture (i.e. touching or pointing to the element), gaze (as shown by gaze lines 906), or other suitable manner. In response, the see-through display device may display a functionality of the specified element, as indicated at 908. In some embodiments, augmentation images 908 may not be displayed depending upon a state of the vehicle and/or driver (e.g. when the vehicle is determined to be moving or moving at a speed greater than a threshold). It will be understood that an appearance of controls for any suitable vehicle and/or other mechanical device may be similarly augmented.

Figure 10:
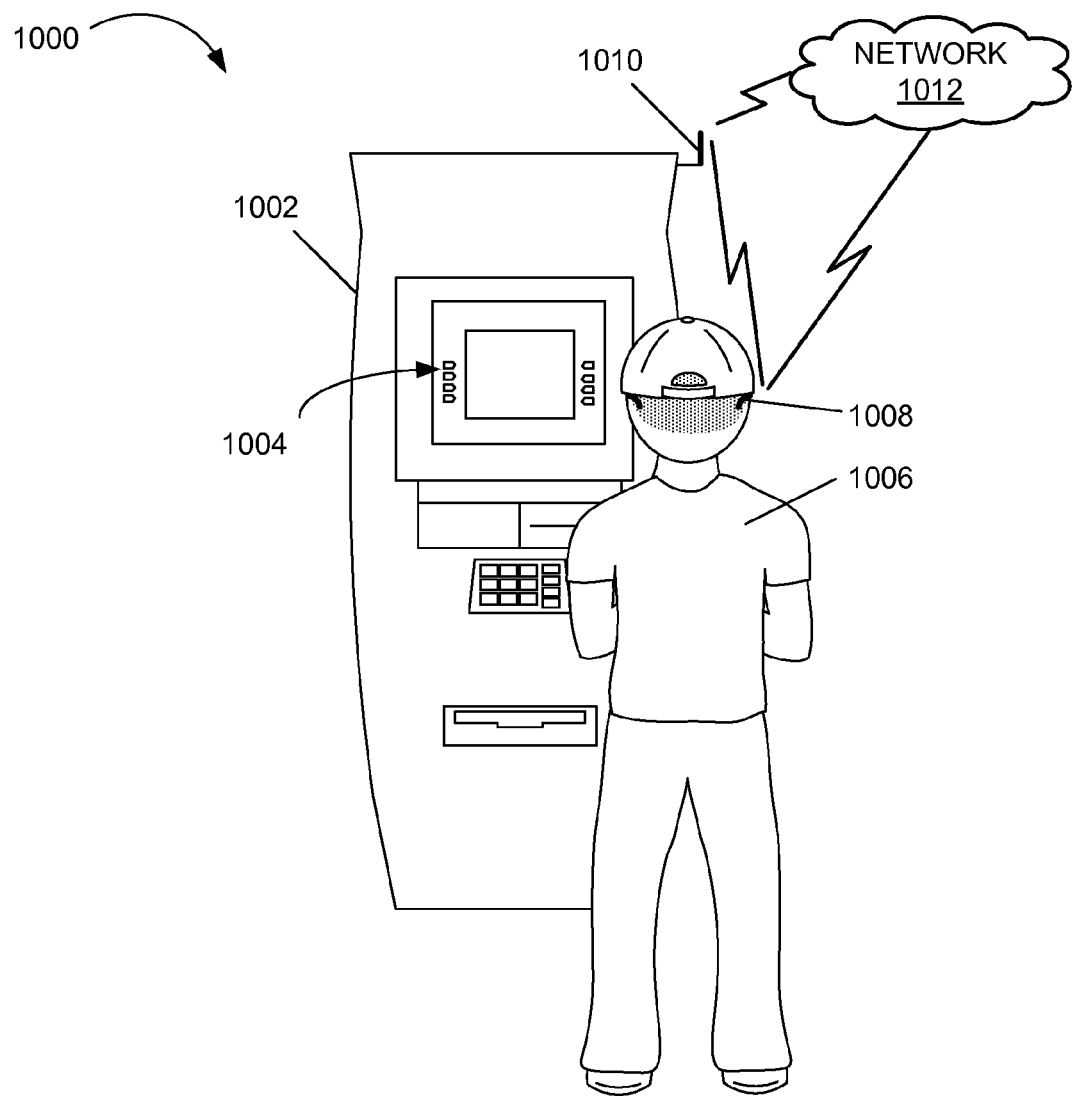
FIG. 10 schematically shows another example physical space including an embodiment of a control device.

FIG. 10 schematically shows another example physical space 1000 in the form of an environment that includes a control device in the form of a kiosk 1002. The kiosk 1002 may include interactive elements, such as buttons 1004 actuatable by a user 1006, wherein the buttons may have different functions based on a state of the kiosk 1002. For example, the kiosk 1002 may be an automated teller machine (ATM), and the buttons 1004 may provide different functions based on a current location in a menu system.

A see-through display device 1008 may detect the presence of the kiosk 1002 in a field of view of the user 1006 and/or the see-through display device 1008, and in response may request or retrieve information to identify the kiosk 1002. Additionally or alternatively, the see-through display device 1008 may detect the kiosk 1002 by identifying a beacon signal emitted by the kiosk 1002, scanning and identifying a barcode or Q-code located on or near the kiosk 1002, recognizing an image of the kiosk 1002 acquired by a depth or imaging sensor of see-through display device, receiving a user input including information regarding the kiosk 1002, and/or in any other suitable manner.

The see-through display device 1008 may connect directly to the kiosk 1002 via a peer-to-peer connection, through a network access point, or in any suitable manner. Once connected, the kiosk 1002 may transmit information to the see-through display device 1008 identifying functions of the buttons 1004. The information transmitted by the kiosk 1002 may be updated dynamically in response to changes in a state of the kiosk 1002. In this manner, the see-through display device 1008 may update augmentation images to ensure that current button functionalities are correctly displayed.

Figure 11:
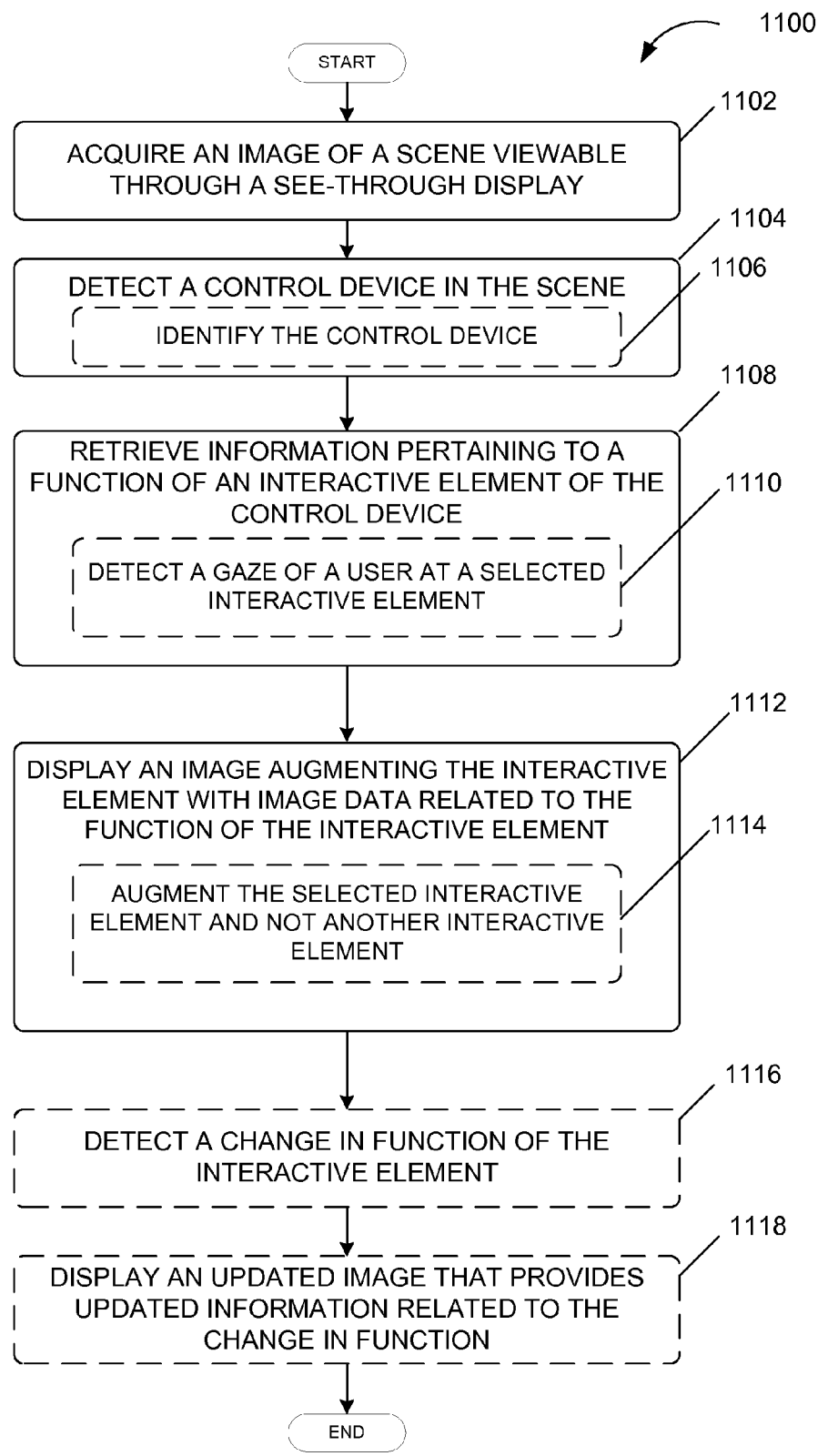
FIG. 11 is a flow chart illustrating an embodiment of a method for providing instructional information for control devices via a see-through display device.

FIG. 11 shows a flow chart illustrating an embodiment of a method 1100 for displaying instructional information for control devices via a see-through display device. At 1102, the see-through display device acquires an image of a scene viewable through the see-through display, for example using image sensors as discussed in more detail above with respect to FIGS. 1-3. At 1104, the see-through display device detects a control device in the scene, for example, by analysis of image data acquired of the scene. The see-through display device further may identify the control device at 1106, for example, via a classification function. It will be understood that, in some embodiments, such identification and/or other processes disclosed herein may be performed via a remote service.

After detecting and identifying the control device, the see-through display device retrieves information pertaining to a function of an interactive element of the control device at 1108. Such information may be retrieved in any suitable manner. For example, in some instances, the information may be stored locally, such as when the control device is a known control device (e.g. a user's remote control device) and/or when an application being controlled is a known application. In such instances, the see-through display device may retrieve the information from local storage. In other instances, the see-through display device may retrieve the information from the control device, a network-based service, and/or from any other suitable location.

In some embodiments, information may be obtained for a subset of interactive elements of the control device. For example, in some embodiments, the see-through display device may detect a gaze of a user at a selected interactive element at 1110, and obtain information for that element. Gaze detection also may be used to display information for a selected element to the exclusion of other elements (e.g. in the instance of a car dashboard) where information for other elements has been obtained.

At 1112, the see-through display device displays an image augmenting the interactive element with image data related to the function of the interactive element. Such image data may comprise any suitable information, including but not limited to graphical elements, text, animation, etc. Further, as mentioned above, in some embodiments, a see-through display device may be configured to augment a selected interactive element to the exclusion of another interactive element, as indicated at 1114 to reduce any distractions that may be caused by displaying information not of current interest.

As mentioned above, the function of an interactive element of a control device may change in some instances. Thus, method 1100 comprises, at 1116, detecting a change in function of the interactive element at 1116. Such a change may arise from a change in an application being controlled, a change in the state of an application being controlled, and/or from any other suitable changes. In response, the see-through display device may display an updated image that provides updated information related to the new function, as indicated at 1118. For example, the see-through display device may receive and/or retrieve updated information and display the updated information as one or more additional or alternative augmentation images. This may help to ensure that current information is displayed.

Figure 12:
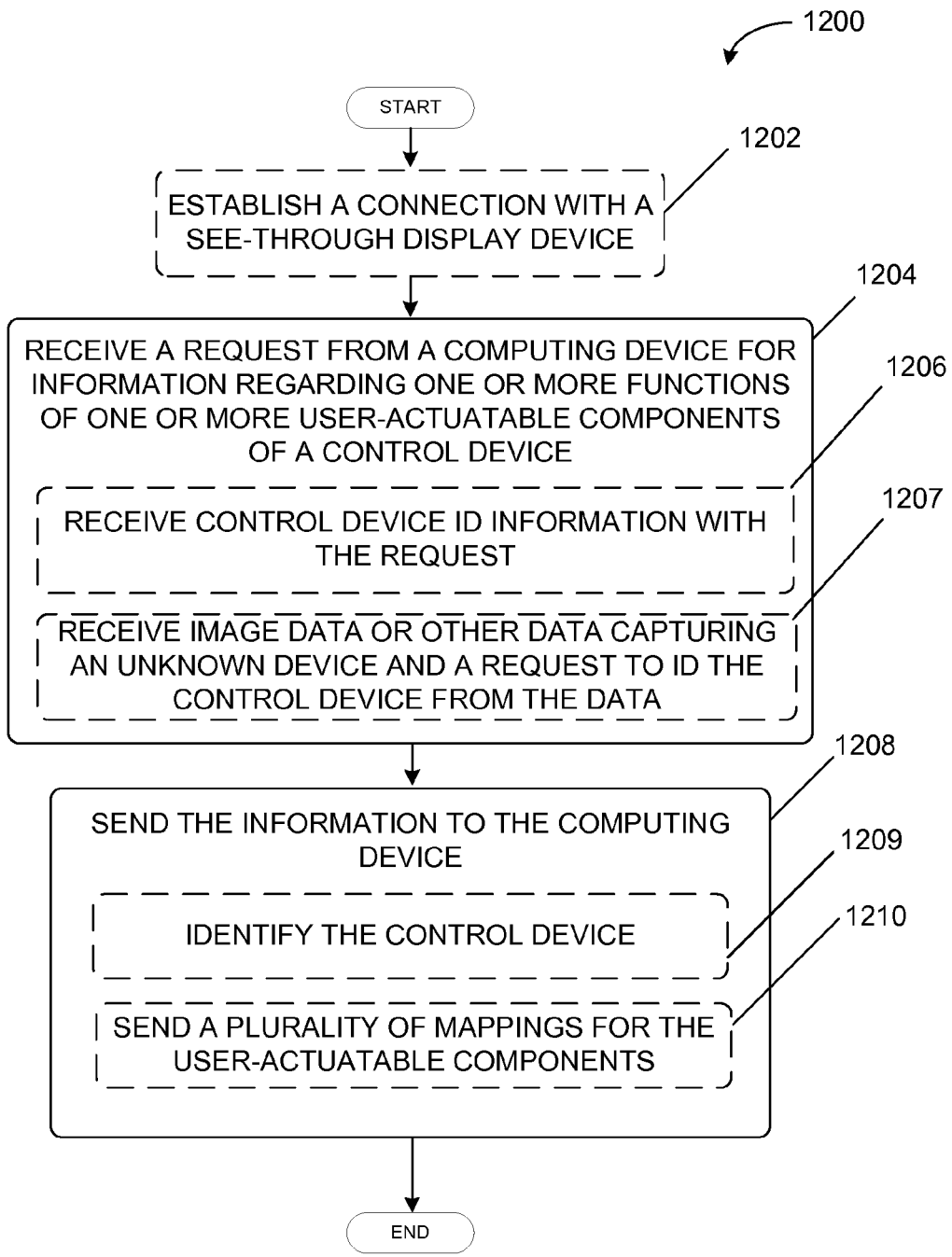
FIG. 12 is a flow chart illustrating an embodiment of a method for providing instructional information to a see-through display device regarding operation of a control device.

As mentioned above, in some instances, a see-through display device may receive information regarding a current functionality of an interactive element of a control device. FIG. 12 shows a flow chart illustrating an embodiment of a method 1200 for providing such information to another computing device, such as a see-through display device, from a control device. Method 1200 comprises, at 1202, establishing a connection with a see-through display device. Any suitable type of connection may be established. Examples include, but are not limited to, direct wired and/or wireless connections (e.g. WiFi direct, Bluetooth, etc.), as well as connection via network access point.

At 1204, method 1200 includes receiving a request from the second computing device for information regarding a current functionality of one or more user-actuatable components of the control device. This may comprise, at 1206, receiving control device identification information with the request. This also may comprise, at 1207, receiving image data or other data capturing an unknown control device and a request to identify the control device from the data.

In response to the request, the first computing device sends the information to the second computing device at 1208. This may further comprise, at 1209, identifying the control device (e.g. via classification of image data via one or more classification functions) to assist in sending the requested control device functionality information. Further, in some embodiments, the first computing device may send a plurality of mappings for the user-actuatable components of the control device at 1210, the plurality of mappings each corresponding to a different state of an application associated with the application information received at 1206. It will be understood that the computing device that establishes the connection and communicates with the see-through display device may be any suitable computing device, including but not limited to a server running a remote service, a kiosk, etc.

In some embodiments, the above described methods and processes may be tied to a computing system including one or more computers. In particular, the methods and processes described herein may be implemented as a computer application, computer service, computer API, computer library, and/or other computer program product.

Figure 13:
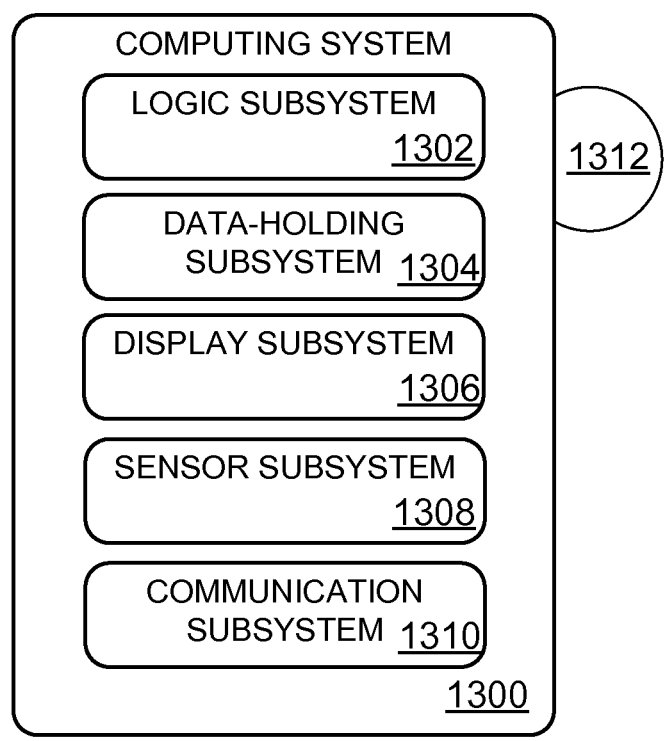
FIG. 13 is a block diagram of an example embodiment of a computing system.

FIG. 13 schematically shows a nonlimiting computing system 1300 that may perform one or more of the above described methods and processes. The computing system 1300 is shown in simplified form. It is to be understood that virtually any computer architecture may be used without departing from the scope of this disclosure. In different embodiments, the computing system 1300 may take the form of a mainframe computer, server computer, desktop computer, laptop computer, tablet computer, home entertainment computer, network computing device, mobile computing device, mobile communication device, gaming device, head-mounted display device, see-through display device, etc.

The computing system 1300 includes a logic subsystem 1302 and a data-holding subsystem 1304. The computing system 1300 may optionally include a display subsystem 1306, a sensor subsystem 1308, a communication subsystem 1310, and/or other components not shown in FIG. 13. The computing system 1300 may also optionally include user input devices such as keyboards, mice, game controllers, cameras, microphones, and/or touch screens, for example.

The logic subsystem 1302 may include one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

The data-holding subsystem 1304 may include one or more physical, non-transitory, devices configured to hold data and/or instructions executable by the logic subsystem to implement the herein described methods and processes. When such methods and processes are implemented, the state of the data-holding subsystem 1304 may be transformed (e.g., to hold different data).

The data-holding subsystem 1304 may include removable media and/or built-in devices. The data-holding subsystem 1304 may include optical memory devices (e.g., CD, DVD, HD-DVD, flu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem 1304 may include devices with one or more of the following characteristics: volatile, nonvolatile, dynamic, static, read/write, read-only, random access, sequential access, location addressable, file addressable, and content addressable. In some embodiments, the logic subsystem 1302 and the data-holding subsystem 1304 may be integrated into one or more common devices, such as an application specific integrated circuit or a system on a chip.

FIG. 13 also shows an aspect of the data-holding subsystem in the form of removable computer-readable storage media 1312, which may be used to store and/or transfer data and/or instructions executable to implement the herein described methods and processes. The removable computer-readable storage media 1312 may take the form of CDs, DVDs, HD-DVDs, Blu-Ray Discs, EEPROMs, and/or floppy disks, among others.

It is to be appreciated that the data-holding subsystem 1304 includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The term "program" may be used to describe an aspect of the computing system 1300 that is implemented to perform one or more particular functions, in some cases, such a program may be instantiated via the logic subsystem 1302 executing instructions held by the data-holding subsystem 1304. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, the display subsystem 1306 may be used to present a visual representation of data held by the data-holding subsystem 1304. For example, the display subsystem 1306 may be a see-through display, as described above. As the herein described methods and processes change the data held by the data-holding subsystem, and thus transform the state of the data-holding subsystem, the state of the display subsystem 1306 may likewise be transformed to visually represent changes in the underlying data. The display subsystem 1306 may include one or more display devices utilizing virtually any type of technology. Such display devices may be combined with the logic subsystem 1302 and/or the data-holding subsystem 1304 in a shared enclosure, or such display devices may be peripheral display devices.

When included, the communication subsystem 1310 may be configured to communicatively couple the computing system 1300 with one or more other computing devices. For example, in the instance of a see-through display device, the communication subsystem 1310 may be configured to communicatively couple the computing system 1300 to one or more other see-through display devices, a gaming console, a kiosk, a control device, and/or any other computing device. The communication subsystem 1310 may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow the computing system 1300 to send and/or receive messages to and/or from other devices via a network such as the Internet.

The sensor subsystem 1308 may include one or more sensors configured to sense different physical phenomenon (e.g., visible light, infrared light, acceleration, orientation, position, etc.), as described above. For example, the sensor subsystem 1308 may comprise one or more image sensors, motion sensors such as accelerometers, touch pads, touch screens, and/or any other suitable sensors. Therefore, the sensor subsystem 1308 may be configured to provide observation information to the logic subsystem 1302, for example. As described above, observation information such as image data, motion sensor data, and/or any other suitable sensor data may be used to perform such tasks as determining a particular gesture performed by a user, detecting a gaze of a user, performing object recognition, etc.

In some embodiments, the sensor subsystem 1308 may include a depth camera (e.g., the outward facing sensor 206 of FIG. 2), including but not limited to a structured light camera, a time-of-flight camera, a stereo camera system, or any other suitable depth-resolving camera.

In some embodiments, the sensor subsystem 1308 may include a visible light camera. Virtually any type of digital camera technology may be used without departing from the scope of this disclosure. As a non-limiting example, the visible light camera may include a charge coupled device image sensor.

It is to be understood that the configurations and/or approaches described herein presented for the purpose of example, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a see-through display device comprising a see-through display and an outward-facing image sensor, a method for providing instructional information for control devices, the method comprising:
   acquiring an image of a physical scene viewable through the see-through display;
   detecting a control device in the physical scene, the control device comprising a physical user-actuatable input device configured to control an associated computing device separate from the see-through display device;
   retrieving information pertaining to a function of the physical user-actuatable input device of the control device, the function of the physical user-actuatable input device comprising a control instruction for the associated computing device;
   displaying an image on the see-through display augmenting an appearance of the physical user-actuatable input device of the control device with image data related to the function of the physical user-actuatable input device;
   detecting a change in function of the physical user-actuatable input device; and
   displaying an updated image augmenting the appearance of the physical user-actuatable input device, the updated image providing updated information related to the change in function of the physical user-actuatable input device.

2. The method of claim 1, wherein the image comprises a graphical element related to the function of the physical user-actuatable input device, the graphical element being displayed on the see-through display over the physical user-actuatable input device.

3. The method of claim 1, wherein the image comprises a text box having text information describing the physical user-actuatable input device.

4. The method of claim 3, further comprising receiving a selection of the text box, and in response displaying additional information on the see-through display device.

5. The method of claim 1, wherein the image comprises an animation.

6. The method of claim 1, further comprising detecting a gaze of a user of the see-through display device at a selected physical user-actuatable input device of the control device, and wherein the image augments an appearance of the selected physical user-actuatable input device and not another input device.

7. The method of claim 1, wherein retrieving the information comprises retrieving the information from the control device.

8. The method of claim 1, wherein retrieving the information comprises retrieving the information from a network-based service.

9. A portable see-through display device, comprising:
   an image sensor;
   a see-through display;
   a logic subsystem; and
   a data-holding subsystem comprising instructions executable by the logic subsystem to:
      acquire an image of a physical scene viewable through the see-through display;
      detect a control device in the physical scene, the control device comprising a physical user-actuatable input device configured to control an associated computing device separate from the portable see-through device;
      retrieve information pertaining to a function of the physical user-actuatable input device of the control device, the function of the physical user-actuatable input device comprising a control instruction for the associated computing device;
      display on the see-through display an image augmenting an appearance of the physical user-actuatable input device of the control device, the image being related to the-function of the physical user-actuatable input device;
      detect a change in function of the physical user-actuatable input device; and
      display an updated image augmenting the appearance of the physical user-actuatable input device, the updated image providing updated information related to the change in function of the physical user-actuatable input device.

10. The device of claim 9, wherein the instructions are executable to detect a change in function of the physical user-actuatable input device by detecting a change in a current state of an application being controlled by the control device.

11. The device of claim 9, wherein the instructions are executable to detect a keyboard in the physical scene and display on the see-through display an image augmenting an appearance of keys of the keyboard in accordance with an application being controlled by the keyboard.

12. The device of claim 9, wherein the instructions are executable to display the image in the form of a graphical element related to the function of the physical user-actuatable input device that is displayed on the see-through display over the physical user-actuatable input device.

13. The device of claim 9, wherein the instructions are executable to display the image in the form of a text box having text information describing the physical user-actuatable input device.

14. The device of claim 13, wherein the instructions are further executable to receive a selection of the text box, and in response display additional information on the see-through display device.

15. The device of claim 9, wherein the instructions are executable to display the image in the form of an animation.

16. The device of claim 9, further comprising an inward-facing sensor configured to detect a gaze of a user of the see-through display device at a selected physical user-actuatable input device of the control device, and wherein the instructions are further executable to display the image augmenting an appearance of the selected physical user-actuatable input device and not another input device.

17. On a first computing device, a method for providing information regarding operation of a control device, the method comprising:
    receiving a request from a second computing device for information regarding one or more functions of one or more physical user-actuatable input devices of the control device, the one or more functions including an instruction that is provided to an associated computing device being controlled by the control device and being separate from the second computing device;
    in response to the request, sending the information to the second computing device;
    receiving information regarding a change in one or more functions of one or more physical user-actuatable input devices of the control device; and
    sending updated information to the second computing device, the updated information related to the change in function of the physical user-actuatable input device.

18. The method of claim 17, wherein the first computing device is configured to receive input from the control device, and wherein the method further comprises establishing a direct connection with the second computing device and receiving the request via the direct connection.

19. The method of claim 17, further comprising establishing a connection with the first device over a network and receiving the request via the network.

20. The method of claim 17, further comprising receiving application information with the request and sending a plurality of mappings for the one or more physical user-actuatable input devices of the control device, the plurality of mappings each corresponding to a different state of an application that is executed on the associated computing device being controlled by the control device and associated with the application information.

* * * * *